(12) United States Patent
Shimizu et al.

(10) Patent No.: US 9,708,988 B2
(45) Date of Patent: Jul. 18, 2017

(54) CONTROL DEVICE OF ENGINE WITH TURBOCHARGER AND METHOD OF CONTROLLING THE ENGINE

(71) Applicants: Masato Shimizu, Toyota (JP); Osamu Kanai, Nagoya (JP)

(72) Inventors: Masato Shimizu, Toyota (JP); Osamu Kanai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 14/787,969

(22) PCT Filed: Apr. 29, 2014

(86) PCT No.: PCT/IB2014/000631
§ 371 (c)(1),
(2) Date: Oct. 29, 2015

(87) PCT Pub. No.: WO2014/177923
PCT Pub. Date: Nov. 6, 2014

(65) Prior Publication Data
US 2016/0084178 A1    Mar. 24, 2016

(30) Foreign Application Priority Data

Apr. 30, 2013 (JP) .................................. 2013-095181
Apr. 25, 2014 (JP) .................................. 2014/091750

(51) Int. Cl.
*F02D 41/00*    (2006.01)
*F02D 41/10*    (2006.01)
(Continued)

(52) U.S. Cl.
CPC ......... *F02D 41/0007* (2013.01); *F02D 33/02* (2013.01); *F02D 41/10* (2013.01);
(Continued)

(58) Field of Classification Search
CPC .. F02D 41/0007; F02D 41/10; F02D 2250/18; F02D 2250/26
See application file for complete search history.

(56) References Cited

U.S. PATENT DOCUMENTS 9,476,368 B2 * 10/2016 Tokura ............... F02M 35/1038
2002/0134080 A1 * 9/2002 Ostertag ................. F02B 37/18
60/602

(Continued)

FOREIGN PATENT DOCUMENTS

JP    2001-248491 A    9/2001
JP    2003-517137 A    5/2003
(Continued)

*Primary Examiner* — Carlos A Rivera
*Assistant Examiner* — Sherman Manley
(74) *Attorney, Agent, or Firm* — Oliff PLC

(57) ABSTRACT

A control device of an engine including an exhaust gas turbocharger having an exhaust driven turbine with a turbine wheel and a compressor wheel includes an electronic control unit configured to set a target output torque based on a required value of an output torque for the engine, regulate the output torque of the engine to the target output torque, and limit an increase of an actual output torque of the engine from a timing at which a rate of increase of the actual output torque exceeds a predetermined value, when the target output torque is larger by at least a predetermined amount than the actual output torque and the rate of increase of the actual output torque is equal to or smaller than the predetermined value.

9 Claims, 6 Drawing Sheets

(51) Int. Cl.
*F02D 33/02* (2006.01)
*F02D 41/14* (2006.01)
(52) U.S. Cl.
CPC .. *F02D 41/1401* (2013.01); *F02D 2200/1002* (2013.01); *F02D 2250/18* (2013.01); *F02D 2250/26* (2013.01); *Y02T 10/144* (2013.01)

(56) References Cited

U.S. PATENT DOCUMENTS

| | | | | |
|---|---|---|---|---|
| 2004/0016419 | A1* | 1/2004 | Satou | F02D 11/105 123/492 |
| 2006/0196182 | A1* | 9/2006 | Kimoto | F02B 33/44 60/605.1 |
| 2008/0098734 | A1* | 5/2008 | Olsson | F02B 37/12 60/605.1 |
| 2009/0007564 | A1* | 1/2009 | Suzuki | F02B 37/18 60/602 |
| 2015/0101569 | A1* | 4/2015 | Yoshizaki | F02D 41/023 123/344 |
| 2016/0047337 | A1* | 2/2016 | Leone | F01L 1/34 123/406.12 |
| 2016/0123252 | A1* | 5/2016 | Yoshizaki | F02D 41/107 123/436 |

FOREIGN PATENT DOCUMENTS

| | | |
|---|---|---|
| JP | 2008-014281 A | 1/2008 |
| JP | 2009-007934 A | 1/2009 |
| WO | 01/44641 A2 | 6/2001 |

* cited by examiner

OUTPUT TORQUE

OUTPUT TORQUE

BOOST PRESSURE

THROTTLE OPENING

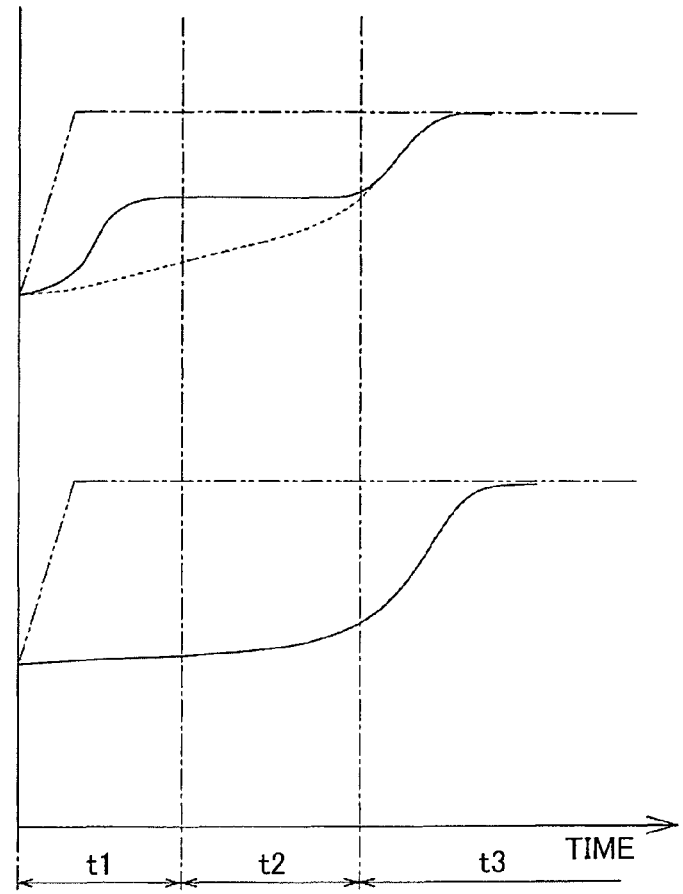

CONTROL DEVICE OF ENGINE WITH TURBOCHARGER AND METHOD OF CONTROLLING THE ENGINE

BACKGROUND OF THE INVENTION

1. Field of the Invention

The invention relates to a control device of an engine with a turbocharger, and a method of controlling the engine.

2. Description of Related Art

As one type of engine installed on a vehicle, such as an automobile, an engine supercharged with air by means of an exhaust gas turbocharger is in practical use. In this type of engine, there is a certain relationship between increase of output torque and increase of the boost pressure, and, even if a throttle valve is opened so as to increase the output torque, it is difficult to quickly increase the output torque since the boost pressure rises with a delay in response to opening of the throttle valve. Therefore, even if a required value of output torque required to be generated from the engine is increased, due to an increase of the amount of accelerator operation by the driver of the vehicle, the output torque of the engine may not necessarily be increased in good response to the increase of the required value.

For example, when the required value of the output torque for the engine increases as indicated by a two-dot chain line in FIG. 6A, the throttle valve is, opened so as to increase the output torque of the engine according to the increased required value. If the throttle valve is opened, air and fuel supplied to combustion chambers are increased to some extent immediately after the opening of the throttle valve. However, the air and fuel subsequently supplied to the combustion chambers are only gradually increased since the boost pressure is not immediately increased. Therefore, the output torque of the engine based on combustion of the fuel in the combustion chambers initially increases as indicated by a solid line in period t1 of FIG. 6A, and then the increase of the output torque stagnates (i.e., slows down or stops) as indicated by the solid line in period t2. However, if the engine speed increases and the flow amount of exhaust gas of the engine increases as the fuel burns in the combustion chambers, the turbocharger is driven by the exhaust gas, and the boost pressure rapidly increases as indicated in FIG. 6B. If the throttle valve is placed in an open state under a situation where the boost pressure is rapidly increased, the amounts of air and fuel supplied to the combustion chambers are quickly increased, and the output torque of the engine based on combustion of the fuel quickly increases in period t3 of FIG. 6A.

In Japanese Patent Application Publication No. 2008-14281 (JP 2008-14281 A), it is proposed to initially suppress output torque of an engine, so as to curb a sudden change or changes in the output torque of the engine from the time when the turbocharger is started to the time when the turbocharger operates with good responsiveness. With the technology of JP 2008-14281 A applied, the output torque of the engine is initially suppressed (in periods t1, t2) before the turbocharger shows sufficient responsiveness and the boost pressure rises as indicated in period t3 of FIG. 6B.

As a result, the output torque of the engine varies as indicated by a broken line in FIG. 6A by way of example, and a sudden change in the output torque is less likely or unlikely to appear in periods t1, t2. At the time of transition from period t2 to period t3, the output torque of the engine increases smoothly.

If the output torque of the engine is initially suppressed before the turbocharger shows sufficient responsiveness, as described in JP 2008-14281 A, a sudden change in the output torque of the engine is less likely or unlikely to appear during a period from the time when the turbocharger is started to the time when the turbocharger shows sufficient responsiveness. However, if the output torque is suppressed as described above when a required value of the output torque for the engine increases due to an increase of the amount of accelerator operation by the driver, the output torque of the engine is inevitably reduced in an early period following the increase of the required value. In this case, the output torque of the engine is not increased as intended by the driver even if the driver increases the accelerator operation amount. Therefore, the driver may feel slowness or sluggishness in increase of the output torque.

If the output torque is not suppressed when the required value of the output torque for the engine increases with increase of the amount of accelerator operation by the driver, the driver will not feel uncomfortable or strange due to the slowness in the increase of the output torque. In this case, however, as the boost pressure rapidly increases at the time of transition from period t2 to period t3 in FIG. 6B, the output torque of the engine rapidly increases as indicated by the solid line in period t3 of FIG. 6A, from a condition where the increase of the output torque stagnates as indicated by the solid line in period t2. Consequently, the driver may feel strange or uncomfortable due to the rapid increase in the output torque of the engine.

SUMMARY OF THE INVENTION

The invention provides a control device of an engine with a turbocharger, with which the driver is less likely or unlikely to feel strange or uncomfortable when the boost pressure rapidly increases from a condition where output torque stagnates (or remains almost constant), while being less likely or unlikely to feel slowness, in increase of the output torque immediately after a required value of the output torque for the engine increases. The invention also provides a method of controlling the engine.

A control device of an engine with a turbocharger according to one aspect of the invention includes an electronic control unit that sets a target output torque based on a required value of output torque for the engine, and regulates the output torque of the engine to the target output torque. The required value of the output torque for the engine increases as the amount of accelerator operation by the driver of the vehicle on which the engine is installed increases. If the target output torque increases as the required value of the output torque increases, the output torque of the engine starts increasing toward the increasing target output torque. However, in the engine supercharged with air by means of the exhaust gas turbocharger, it is difficult to raise the boost pressure with good responsiveness immediately after the output torque starts increasing, and the boost pressure has a tendency of rapidly increasing after the engine speed increases and the flow amount of exhaust gas increases after the output torque starts increasing. Therefore, the output torque that has started increasing as described above once stagnates after initially increasing to some extent while the boost pressure increases at a low rate, and then rapidly increases in accordance with subsequent rapid increase of the boost pressure.

Since the output torque once stagnates after initially increasing to some extent while the boost pressure increases at a low rate after the output torque starts increasing as described above, the target output torque deviates to the larger side from the output torque. In other words, the target output torque deviates to the larger side from the actual output torque of the engine, and the increase of the actual output torque is in a stagnating condition (i.e., the increase of the actual output torque slows down or stops). In this case, the electronic control unit performs a torque limiting operation, so as to limit the increase of the output torque from a timing at which the rate of increase of the actual output torque of the engine exceeds a predetermined value. In this manner, after the output torque once stagnates after starting increasing, the output torque can be prevented from rapidly increasing from the condition where the output torque stagnates as the boost pressure rapidly increases, and the driver is less likely or unlikely to feel strange or uncomfortable due to the rapid increase of the output torque from its stagnating condition.

Also, the increase of the output torque is not limited through the torque limiting operation, while the boost pressure increases at a low rate after the output torque starts increasing. Therefore, the output torque is not limited in an early period after the required value of the output torque for the engine increases as the amount of accelerator operation by the driver increases, namely, in an early period after the output torque starts increasing. If the output torque is limited in this situation, the output torque of the engine is not increased as intended by the driver even if the driver increases the amount of accelerator operation; therefore, the driver may feel slowness or sluggishness in the increase of the output torque. However, according to the above aspect of the invention, the driver will not feel slowness in the increase of the output torque. Accordingly, the driver is less likely or unlikely to feel strange or uncomfortable due to a rapid increase of the output torque from its stagnating condition when the boost pressure rapidly increases, while being less likely or unlikely to feel slowness in the increase of the output torque immediately after the required value of the output torque for the engine increases.

The electronic control unit may limit the increase of the actual output torque of the engine in the torque limiting operation, through control of an opening of the throttle valve. If the output torque of the engine is regulated by changing the opening of the throttle valve (throttle opening), the output torque can be regulated with high responsiveness, in response to change of the throttle opening. Therefore, when the increase of the output torque of the engine is limited in the torque limiting operation through control of the throttle opening as described above, it is possible to increase the output torque with high responsiveness, by adjusting the throttle opening to a larger value when the operation to limit the increase of the output torque is finished.

The electronic control unit may put a reduced limitation on the increase of the output torque, when the required value of the output torque for the engine increases while the increase of the actual output torque of the engine is being limited in the torque limiting operation. If the limitation on the increase of the output torque is not reduced when the required value of the output torque for the engine increases as the amount of accelerator operation by the driver increases while the increase of the output torque of the engine is being limited in the torque limiting operation, the driver may feel slowness or sluggishness in the increase of the output torque responsive to the increase of the accelerator operation amount. However, the limitation on the increase of the output torque in the torque limiting operation is reduced under the above situation; therefore, the driver is less likely or unlikely to feel slowness in the increase of the output torque.

The electronic control unit may finish limiting the increase of the output torque, when the output torque of the engine reaches the required value of the output torque for the engine during the torque limiting operation in which the increase of the output torque is limited. In this case, the torque limiting operation can be appropriately finished when the output torque of the engine reaches the required value, and it becomes unnecessary to limit the increase of the output torque through the torque limiting operation.

The electronic control unit may limit the increase of the output torque of the engine by reducing the target output torque to a value that is smaller than the required value of the output torque for the engine and then gradually increasing the target output torque at a predetermined rate of increase.

The electronic control unit may change the rate of increase of the target output torque according to the required value that has changed, when the required value of the output torque for the engine changes during the torque limiting operation in which the increase of the output torque of the engine is limited. When the required value increases due to an increase in the amount of accelerator operation by the driver while the increase of the output torque of the engine is being limited in the torque limiting operation, it means that the driver attempts to quickly increase the output torque of the engine. On the other hand, when the required value decreases due to a reduction in the amount of accelerator operation by the driver while the increase of the output torque of the engine is being limited in the torque limiting operation, it means that the driver attempts to suppress increase of the output torque of the engine. In view of these facts, it is possible to meet a request of the driver as described above, by increasing the rate of increase of the target output torque when the required value is increased, and reducing the rate of increase of the target output torque when the required value is reduced.

The electronic control unit may perform the torque limiting operation in the following manner. Namely, the electronic control unit calculates a maximum torque that is generated from the engine under a boost pressure to be achieved after a predetermined period of time elapses, when the target output torque is larger by at least the predetermined amount than the actual output torque of the engine and the rate of increase of the actual output torque is equal to or smaller than a predetermined value. The electronic control unit determines a timing at which the rate of increase of the actual output torque of the engine exceeds the predetermined value by monitoring the maximum torque, and limits the increase of the output torque of the engine from the timing. The electronic control unit may perform the following operation when the engine is required to decrease torque temporarily by a control other than a speed control by a transmission which is connected to the engine while the increase of the output torque of the engine is being limited in the torque limiting operation. Namely, the electronic control unit may prohibit limiting the increase of the output torque of the engine and the electronic control unit may control the output torque of the engine based on a requirement to decrease torque temporarily. Incidentally, when the engine is required to decrease torque temporarily by a control other than the speed control, it is desired to increase torque with a good response based on the requirement after torque has decreased.

If limiting the increase of the output torque of the engine is not prohibited when the engine is required to decrease torque temporarily by a control other than the speed control while the increase of the output torque of the engine is being limited in the torque limiting operation as referred to above, the following problem occurs. Namely, limiting the increase of the output torque prevents from the engine increasing torque with a good response after torque has decreased temporarily. Consequently, it is delayed to increase the output torque of the engine after torque has decreased temporarily.

The above problem become suppressed by prohibiting limitation on the increase of the output torque of the engine using the electronic control unit. Therefore, it is possible to increase the output torque of the engine with a good response after the output torque has decreased when the engine is required to decrease torque temporarily while the increase of the output torque of the engine is being limited in the torque limiting operation

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A and FIG. 6B are time charts indicating changes in the output torque of the engine and the boost pressure.

DETAILED DESCRIPTION OF EMBODIMENTS

Figure 1:
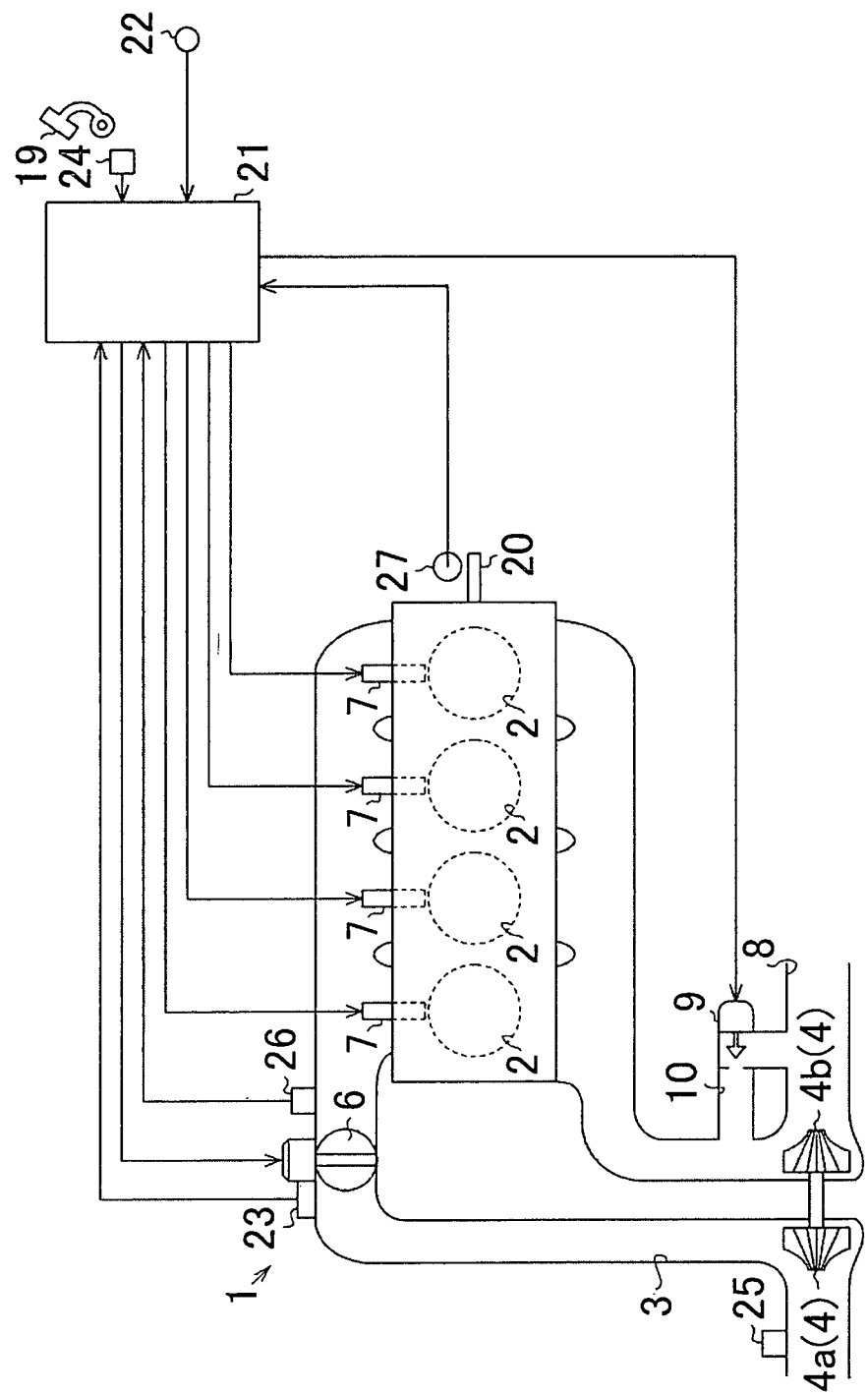
FIG. 1 is a schematic view showing an engine with a turbocharger and a control device of the engine.
Figure 2A:
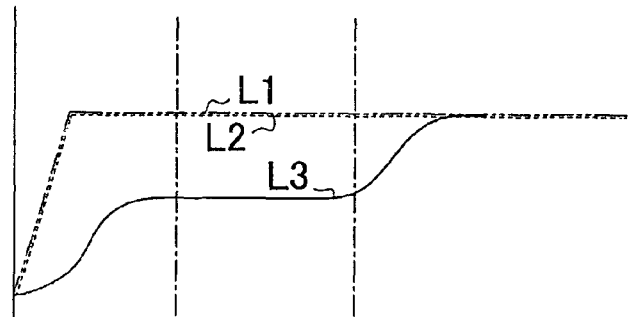
FIG. 2A through FIG. 2D are time charts indicating changes in output torque of the engine, boost pressure, and the throttle opening.
Figure 2B:
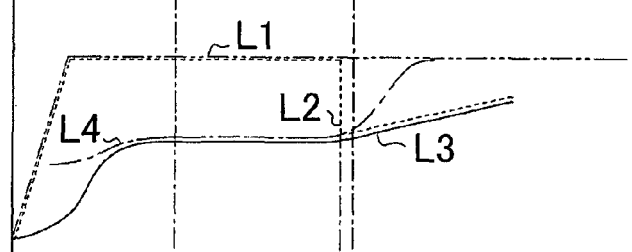
Figure 2C:
Figure 2D:
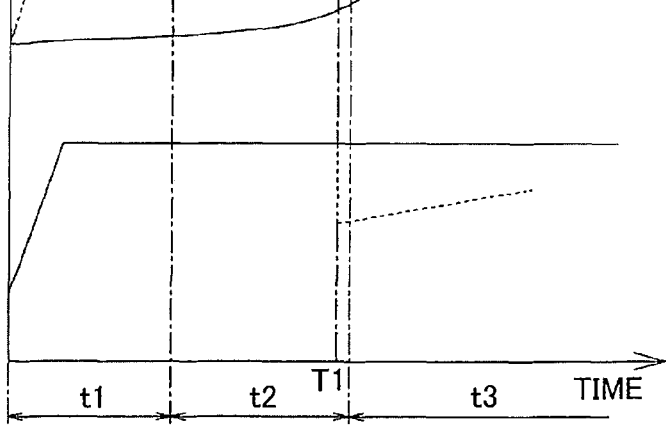
Figure 3:
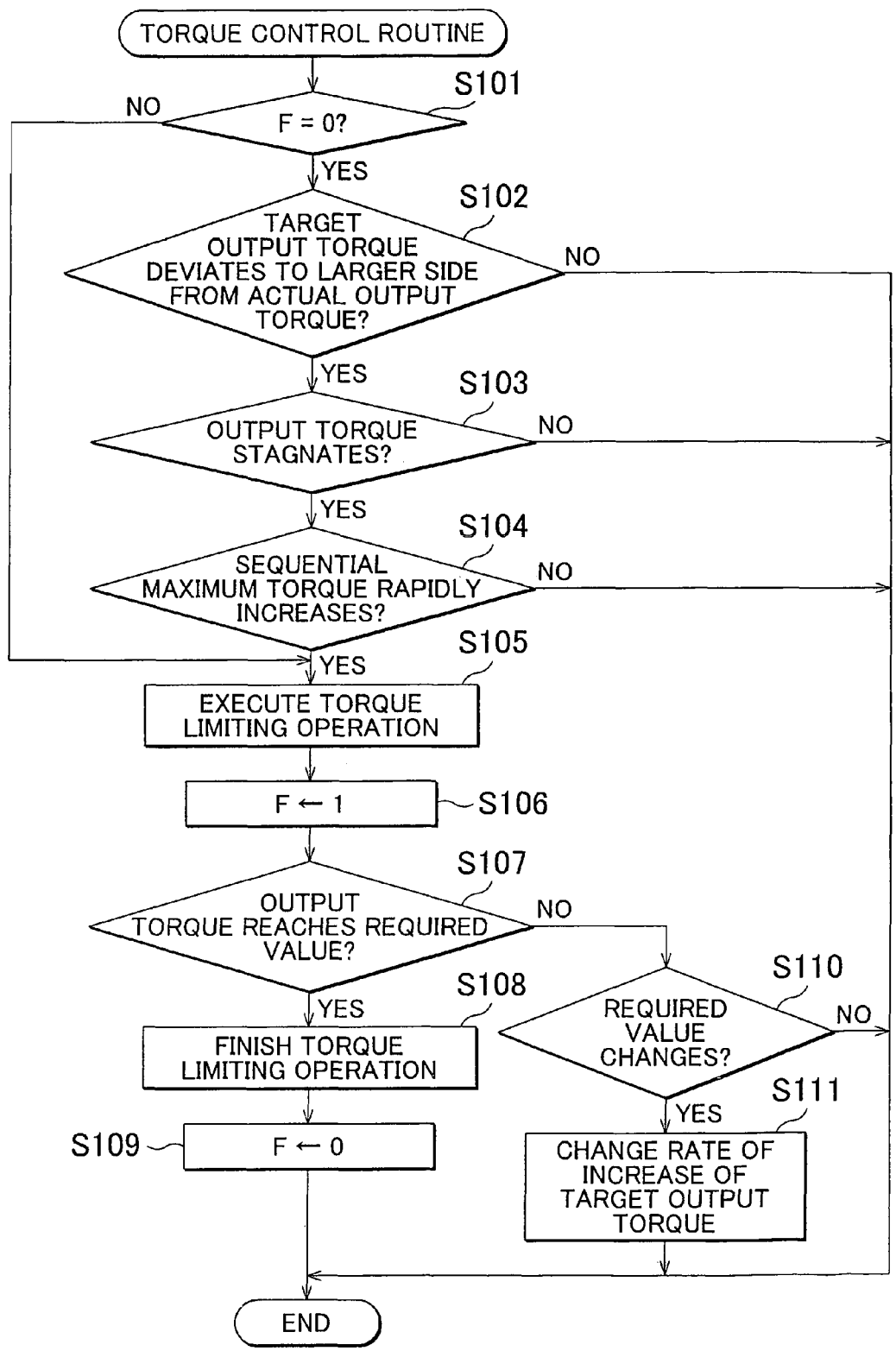
FIG. 3 is a flowchart illustrating a control routine for performing a torque limiting operation.

Referring to FIG. 1 through FIG. 3, a control device of an engine with a turbocharger according to a first embodiment of the invention will be described. As shown in FIG. 1, in an engine 1 installed on a vehicle, a compressor wheel 4a of an exhaust gas turbocharger (turbocharger) is provided in an intake passage 3 to which combustion chambers 2 are connected. Further, a throttle valve 6 that is opened and closed so as to adjust the amount of air supplied to the combustion chambers is provided downstream of the compressor wheel 4a in the intake passage 3. The air that has passed through the intake passage 3 is supplied to the combustion chambers 2 of the engine 1, and fuel whose amount corresponds to the amount of the air is injected from fuel injection valves 7 and supplied to the combustion chambers 2. Then, the engine 1 is driven with the fuel burned in the combustion chambers 2, and a crankshaft 20 as an output shaft of the engine 1 rotates as the engine 1 is driven. In the engine 1, output torque is increased by increasing the amount of air supplied to the combustion chambers 2, and increasing the amount of fuel supplied to the combustion chambers 2 in accordance with the amount of air supplied.

On the other hand, exhaust gas produced after the fuel is burned in the combustion chambers 2 is delivered into an exhaust passage 8 connected to the combustion chambers 2. A turbine wheel 4b of the turbocharger 4 is provided in the exhaust passage 8. When the exhaust gas flowing in the exhaust passage 8 passes the turbine wheel 4b, the turbine wheel 4b rotates, and the compressor wheel 4a also rotate with the turbine wheel 4b, so that the combustion chambers 2 are supercharged with air through rotation of the compressor wheel 4a. In the engine 1 thus supercharged with air by means of the turbocharger 4, the supercharging pressure, or boost pressure, increases as the amount of air supplied to the combustion chambers 2 and the amount of exhaust gas discharged from the combustion chambers 2 increase with increase of the engine speed. As the boost pressure increases, it becomes easier to increase the amounts of fuel and air that can be supplied to the combustion chambers 2, so that the output torque of the engine 1 can be quickly increased.

A waste gate valve 9 that makes the boost pressure of the engine 1 variable is provided in the exhaust passage 8 of the engine 1. More specifically, the waste gate valve 9 is placed in a bypass passage 10 that is connected to the exhaust passage 8 so as to bypass the turbine wheel 4b of the turbocharger 4. The opening of the waste gate valve 9 is adjusted so as to vary the flow passage area of the exhaust gas in the bypass passage 10. The boost pressure of the engine 1 is reduced when the opening of the waste gate valve 9 is increased and the amount of exhaust gas flowing toward the turbine wheel 4b is reduced, whereas the boost pressure is increased when the opening of the waste gate valve 9 is reduced and the amount of exhaust gas flowing toward the turbine wheel 4b is increased.

The vehicle on which the above-described engine 1 is installed is also provided with an electronic control unit 21 that performs various controls on the engine 1. The electronic control unit 21 includes CPU that carries out arithmetic processing or computing associated with the above-mentioned various controls, ROM in which programs and data needed for the controls are stored, RAM in which the computation results of the CPU, etc. are temporarily stored, input and output ports through which signals are received from and generated to the outside, and so forth.

Various sensors as indicated below, etc. are connected to the input port of the electronic control unit 21. The sensors include a vehicle speed sensor 22 that detects the running speed (vehicle speed) of the vehicle, and a throttle position sensor 23 that detects the opening (throttle opening) of the throttle valve 6.

The sensors also include an accelerator position sensor 24 that detects the operation amount (accelerator operation amount) of an accelerator pedal 19 operated by the driver of the vehicle, and an air flow meter 25 that detects the amount of air that passes through the intake passage 3.

The sensors further include a pressure sensor 26 that detects the pressure (boost pressure) on the downstream side of the throttle valve 6 in the intake passage 3, and a crank position sensor 27 for detecting the rotational speed of the crankshaft 20 of the engine 1.

A drive circuit of the fuel injection valves 7, a drive circuit of the throttle valve 6, a drive circuit of the waste gate valve 9, etc. are connected to the output port of the electronic control unit 21. The electronic control unit 21 grasps operating conditions, such as the engine speed and the engine load (the amount of air drawn into the combustion chamber 2 per cycle of the engine 1), of the engine 1, based on detection signals received from the above-indicated various sensors. The engine speed is obtained based on a detection signal from the crank position sensor 27. The engine load is calculated from the intake air amount of the engine 1 obtained based on detection signals of the accelerator position sensor 24, throttle position sensor 23, air flow meter 25, etc., and the engine speed. The electronic control unit 21 outputs command signals to various drive circuits connected to the output port, according to the operating conditions, such as the engine speed and the engine load, of the engine 1. In this manner, the fuel injection amount control, opening control of the throttle valve 6, drive control of the waste gate valve 9, etc. in the engine 1 are performed through the electronic control unit 21.

Next, control of the output torque of the engine 1 performed through the electronic control unit 21 will be described. The electronic control unit 21 obtains a required value of output torque that is required to be generated from the engine 1, based on the vehicle speed, the amount of accelerator operation by the driver, etc., and then sets a target output torque as a target value of the output torque of the engine 1, based on the required value. The electronic control unit 21 controls the boost pressure of the engine 1 and the opening of the throttle valve 6, so that the output torque of the engine 1 is regulated toward the thus set target output torque. At this time, the electronic control unit 21 functions as a controller for regulating the output torque of the engine 1 to the target output torque. The control of the boost pressure of the engine 1 is implemented through adjustment of the opening of the waste gate valve 9.

If the required value of the output torque for the engine 1 increases as indicated by two-dot chain line L1 in FIG. 2A, for example, as the amount of accelerator operation by the driver increases, the target output torque also increases as indicated by broken line L2 as the required value increases. If the target output torque increases as the required value of the output torque for the engine 1 increases, the output torque of the engine 1 starts increasing toward the increasing target output torque. More specifically, the required value of the boost pressure increases as indicated by a two-dot chain line in FIG. 2C, and the opening of the waste gate valve 9 is adjusted to a smaller value (for example, the waste gate valve 9 is placed in the fully closed state) so as to increase the boost pressure in response to the increase in the required value. Further, the opening of the throttle valve 6 is increased as indicated by a solid line in FIG. 2D. It is, however, to be noted that, in the engine 1 supercharged with air by means of the turbocharger 4, it is difficult to raise the boost pressure with good responsiveness immediately after the output torque starts increasing, and the boost pressure has a tendency of rapidly increasing after the engine speed increases and the flow amount of exhaust gas increases after the output torque starts increasing.

Accordingly, if the opening of the throttle valve 6 is increased as described above, the amount of the air supplied to the combustion chambers 2 is increased to some extent immediately after the throttle opening is increased (during period t1 of FIG. 2), and the amount of the fuel supplied to the combustion chambers 2 is also increased to some extent, in accordance with the amount of the air. However, the boost pressure does not immediately rise as indicated by a solid line in FIG. 2C. Thus, after the air and fuel supplied to the combustion chambers 2 are increased to some extent immediately after the opening of the throttle valve 6 is increased as described above, the air and the fuel increase only gradually. Therefore, after the output torque of the engine 1 based on combustion of the fuel in the combustion chambers 2 increases as indicated by solid line L3 in period t1 of FIG. 2A, the increase of the output torque stagnates (i.e., slows down or stops) as indicated by solid line L3 in period t2. Thereafter, as the engine speed increases and the flow amount of exhaust gas of the engine 1 increases due to combustion of the fuel in the combustion chambers 2, the turbocharger 4 is driven by the exhaust gas, and the boost pressure rapidly increases as indicated by a solid line in period t3 of FIG. 2C. If the throttle valve 6 is kept in the open state under a situation where the boost pressure rapidly increases, the amounts of the air and fuel supplied to the combustion chambers 2 also rapidly increase, and the output torque of the engine 1 based on combustion of the fuel rapidly increases as indicated by solid line 13 in period t3 of FIG. 2A.

As is understood from FIG. 2A through FIG. 2D, the output torque increases relatively rapidly in an early period after the required value (L1) of the output torque for the engine 1 increases with increase of the amount of accelerator operation by the driver, namely, in an early period (period t1) after the output torque (L3) starts increasing; therefore, the driver does not feel slowness or sluggishness in the increase of the output torque. However, in a transition period from period t2 to period t3 of FIG. 2C, the boost pressure rapidly increases, whereby the output torque of the engine 1 rapidly increases from a condition where it stagnates (i.e., remains almost constant), as indicated by solid line L3 in period t2 and period t3 of FIG. 2A. The rapid increase of the output torque from its stagnating condition causes the driver to feel strange or uncomfortable. To deal with this situation, the electronic control unit 21 limits the rate of increase of the output torque of the engine 1 from the time when the output torque starts rapidly increasing, when the target output torque (L2) deviates to the larger side from the actual output torque (13) of the engine 1, and the increase of the actual output torque stagnates. Namely, a torque limiting operation to limit the rate of increase of the output torque from the time when the output torque of the engine 1 starts rapidly increasing is performed.

Next, the operation of the control device of the engine 1 according to this embodiment will be described. As shown in FIG. 2B, during a period (periods t1, t2) in which the boost pressure increases slowly after the output torque (L1) of the engine 1 starts increasing, the output torque (L3) initially increases to some extent, and once stagnates (i.e., remains almost constant). Therefore, the target output torque (L2) deviates to the larger side from the output torque (13). In other words, the target output torque deviates to the larger side from the actual output torque of the engine 1, and the increase of the actual output torque stagnates (i.e., slows down or stops). In this case, the electronic control unit 21 performs the torque limiting operation, so as to limit the rate of increase of the output torque, from a point in time (a transition point from period t2 to period t3) at which the output torque of the engine 1 starts rapidly increasing. As a result, the output torque of the engine 1 gradually increases as indicated by solid line L3 in period t3 of FIG. 2B. Therefore, after the output torque once stagnates after starting increasing (after period t2), the output torque is prevented from rapidly increasing with a rapid increase of the boost pressure, from the condition where the increase of the output torque stagnates, and the driver does not feel strange or uncomfortable due to the rapid increase of the output torque from its stagnating condition. Also, the output torque increases at a relatively high rate, immediately after the output torque of the engine 1 starts increasing (period t1); therefore, the driver does not feel slowness in the increase of the output torque. Accordingly, the driver is less likely or unlikely to feel strange or uncomfortable due to the rapid increase of the output torque from its stagnating condition when the boost pressure rapidly increases, while being less likely or unlikely to feel slowness in the increase of the output torque immediately after the required value of the output torque for the engine 1 increases.

The torque limiting operation is performed by the electronic control unit 21 in the following manner. The electronic control unit 21 predicts and obtains sequential maximum torque as the maximum value of torque that can be generated from the engine 1 under the boost pressure that will be achieved at a point in time when a given period of time (e.g., 100 ms) elapses, based on the boost pressure, engine speed, engine load, opening command value of the waste gate valve 9, and the throttle opening, for example. The sequential maximum torque thus obtained varies as indicated by one-dot chain line L4 in FIG. 2B by way of example. The sequential maximum torque varies in substantially the same manner as the output torque indicated by solid line 13 in FIG. 2A, while preceding the same torque (L3) by the above-indicated given period of time. The output torque as indicated by solid line L3 in FIG. 2A is regulated toward the target output torque (broken line L2 in FIG. 2A) set based on the required value of the output torque for the engine 1, when the required value increases as the amount of accelerator operation by the driver increases. The electronic control unit 21 finds a point in time (a transition point from period t2 to period t3) at which the output torque of the engine 1 starts rapidly increasing, by monitoring the sequential maximum torque, and executes the operation to limit the rate of increase of the output torque of the engine 1 from that point in time.

To achieve a limitation on the rate of increase of the output torque of the engine 1 by the torque limiting operation, the electronic control unit 21 reduces the target output torque to a value smaller than the required value (two-dot chain line) at time T1, as indicated by broken line L2 in FIG. 2B, and then gradually increases the target output torque at a given rate of increase. It is preferable to variably set the rate of increase of the target output torque, based on the magnitude of the required value (L1) of the output torque for the engine 1, and the length of the period (period t2 of FIG. 2) over which the increase of the output torque stagnates. For example, the rate of increase of the target output torque (L2) may be increased as the required value is larger. This is because the driver may feel slowness in the increase of the output torque, if the output torque (L3) of the engine 1 increases at an excessively low rate when the required value is large. Also, the rate of increase of the target output torque (L2) may be reduced as the above-indicated period t2 is longer. This is because the driver is more likely to feel uncomfortable due to rapid increase of the output torque of the engine at the time of transition from period t2 to period t3, as the period t2 is longer.

With the target output torque thus changed as indicated by broken line L2 in FIG. 2B, the rate of increase of the output torque of the engine 1 which is regulated toward the target output torque is limited. As a result, the output torque gradually increases as indicated by solid line L3 in FIG. 2B. To regulate the output torque (L3) of the engine 1 to the target output torque (L2), the opening of the throttle valve 6 of the engine 1 is changed in accordance with change of the target output torque (L2), while the opening of the waste gate valve 9 is set to a normal-time value (in this case, the waste gate valve 9 is fully closed). More specifically, the opening of the throttle valve 6 is gradually changed to the larger side after being changed to the smaller side by a given amount at time T1, as indicated by a broken line in FIG. 2D. Through the adjustment of the openings of the waste gate valve 9 and the throttle valve 6, the output torque of the engine 1 is regulated to the target output torque.

FIG. 3 is a flowchart illustrating a torque limiting routine for carrying out the torque limiting operation. The torque limiting routine, which is an interruption routine, is periodically executed at given time intervals, for example.

The electronic control unit 21 determines in step S101 of the routine of FIG. 3 whether a flag F for determining whether the torque limiting operation is being executed is "0 (not being executed)". If an affirmative decision (YES) is made in step S101, namely, if the flag F is 0, the electronic control unit 21 executes steps S102-S104 so as to determine whether execution conditions for the torque limiting operation are satisfied.

More specifically, the electronic control unit 21 determines in step S102 whether the target output torque deviates to the larger side from the actual output torque of the engine 1 such that a difference between the target output torque and the actual output torque exceeds a given level. The electronic control unit 21 then determines in step S103 whether the increase of the actual output torque of the engine 1 stagnates (i.e., slows down or stops), and determines in step S104 whether the above-described sequential maximum torque rapidly increases. The actual output torque of the engine 1 may be calculated based on engine operating conditions, such as the engine speed and the engine load. If a negative decision (NO) is made in any of steps S102-S104, the electronic control unit 21 once finishes the torque limiting routine. If affirmative decisions (YES) are made in all of the steps S102-S104, the electronic control unit 21 determines that the execution conditions for the torque limiting operation are satisfied. In this case, the control proceeds to step S105.

The electronic control unit 21 executes the torque limiting operation in step S105, and sets the flag F to "1 (being executed)" in step S106. With the flag F thus set to "1", a negative decision (NO) is made in step S101, and the control proceeds directly to step S105 while skipping steps S102-S104. If the torque limiting operation is performed in step S105, the target output torque as indicated by broken line L2 in FIG. 2B is changed to be reduced at time T1, and then changed to be increased at a given rate. In accordance with the changes in the target output torque, the opening of the throttle valve 6 as indicated by the broken line in FIG. 2D is changed to be reduced at time T1, and then changed to be increased at a given rate. In this manner, the rate of increase of the output torque of the engine 1 is limited in period t3. Then, after execution of steps S105 and S106 as described above, the control proceeds to step S107.

The electronic control unit 21 determines in step S107 whether the actual output torque of the engine 1 reaches the required value. An affirmative decision (YES) is made in step S107 when the actual output torque of the engine 1 increases and reaches the required value, or when the required value of the output torque for the engine 1 is reduced due to reduction of the amount of accelerator operation by the driver, whereby the actual output torque reaches the reduced required value. If an affirmative decision (YES) is made in step S107, the electronic control unit 21 finishes the torque limiting operation in step S108, and sets the flag F to "0" in the subsequent step S109. Then, the electronic control unit 21 once finishes the torque limiting routine. As described above, after the torque limiting operation ends, the target output torque is set based on the required value of the output torque for the engine 1, and the output torque of the engine 1 is regulated toward the target output torque.

If, on the other hand, a negative decision (NO) is made in step S107, the control proceeds to step S110. In step S110, the electronic control unit 21 determines whether the required value of the output torque for the engine 1 has changed while the rate of increase of the output torque of the engine 1 is being limited in the torque limiting operation. If a negative decision (NO) is made in step S110, the electronic control unit 21 once finishes the torque limiting routine. If an affirmative decision (YES) is made in step S110, the electronic control unit 21 goes to step S111 to change the rate of increase of the target output torque, based on the required value of the output torque for the engine 1.

If the required value increases due to an increase of the amount of accelerator operation by the driver while the rate of increase of the output torque of the engine 1 is being limited in the torque limiting operation, it means that the driver attempts to quickly increase the output torque of the engine 1. If, on the other hand, the required value decreases due to a reduction of the amount of accelerator operation by the driver while the rate of increase of the output torque is being limited, it means that the driver attempts to suppress the output torque of the engine 1. In view of these facts, the electronic control unit 21 increases the rate of increase of the target output torque as the required value becomes larger, and reduces the rate of increase of the target output torque as the required value becomes smaller, in step S111. It is thus possible to meet the request of the driver as described above, by changing the rate of increase of the target output torque in accordance with change of the required value.

According to this embodiment as described in detail above, the following effects are obtained. When the target output torque deviates to the larger side from the actual output torque of the engine 1 as the driver's accelerator operation amount increases, and the increase of the actual output torque stagnates, the torque limiting operation is performed so as to limit the rate of increase of the output torque, from the time when the output torque of the engine 1 starts rapidly increasing. In this manner, after the output torque once stagnates after it starts increasing, the output torque is prevented from rapidly increasing from its stagnating condition as the boost pressure rapidly' increases, and the driver is less likely or unlikely to feel strange or uncomfortable due to the rapid increase of the output torque from its stagnating condition. Also, immediately after the output torque of the engine 1 starts increasing, the rate of increase of the output torque is not limited through the torque limiting operation, and the output torque increases at a relatively high rate; therefore, the driver will not feel slowness or sluggishness in the increase of the output torque. Accordingly, the driver is less likely or unlikely to feel strange or uncomfortable due to rapid increase of the output torque from its stagnating condition when the boost pressure rapidly increases, while being less likely or unlikely to feel slowness in the increase of the output torque immediately after the required value of the output torque for the engine 1 increases.

The rate of increase of the output torque of the engine 1 is limited in the above-described torque limiting operation, through control of the opening of the throttle valve 6. More specifically, it is possible to limit the rate of increase of the output torque of the engine 1 through the torque limiting operation, by gradually increasing the opening of the throttle valve 6 of the engine 1 after reducing the throttle opening by a given amount, without changing the opening of the waste gate valve 9 from its normal-time value. In this connection, the rate of increase of the output torque of the engine 1 may also be limited by increasing the opening of the waste gate valve 9, thereby to reduce the boost pressure. In this case, however, it is difficult to raise the boost pressure with good responsiveness so as to increase the output torque after the limiting operation is finished or cancelled. If, on the other hand, the rate of increase of the output torque of the engine 1 is limited through control of the opening of the throttle valve 6, the output torque can be regulated in good response to change of the throttle opening, under a situation where the boost pressure is at a certain high level. Therefore, if the opening of the throttle valve 6 is increased after the torque limiting operation is finished or cancelled, the output torque of the engine 1 can be increased with good responsiveness.

If the required value increases due to an increase of the amount of accelerator operation by the driver while the rate of increase of the output torque of the engine 1 is being limited in the torque limiting operation, it means that the driver attempts to quickly increase the output torque of the engine 1. On the other hand, if the required value decreases due to a reduction of the amount of accelerator operation by the driver while the rate of increase of the output torque is being limited, it means that the driver attempts to suppress the output torque of the engine 1. In view of these facts, the rate of increase of the target output torque is increased as the required value becomes larger, so that the rate of increase of the output torque of the engine 1 which is regulated to the target output torque is increased. On the other hand, the rate of increase of the target output torque is reduced as the required value becomes smaller, so that the rate of increase of the output torque of the engine 1 which is regulated to the target output torque is reduced. It is thus possible to meet the request of the driver as described above, by changing the rate of increase of the target output torque in accordance with change of the required value, and thus changing the rate of increase of the output torque of the engine 1 which is regulated to the target output torque.

As described above, the rate of increase of the output torque of the engine 1 is increased as the required value increases due to increase of the amount of accelerator operation by the driver, while the rate of increase of the output torque of the engine 1 is being limited through the torque limiting operation. This means that a reduced limitation is put on the rate of increase of the output torque of the engine 1 in the torque limiting operation. If the limitation put on the rate of increase of the output torque is not reduced but remains unchanged, when the required value of the output torque for the engine increases with increase of the amount of accelerator operation by the driver while the rate of increase of the output torque of the engine 1 is being limited in the torque limiting operation, the driver may feel slowness or sluggishness in the increase of the output torque in response to the increase of the accelerator operation amount. However, since a reduced limitation is put on the rate of increase of the output torque in the torque limiting operation under this situation, the driver is less likely or unlikely to feel the slowness in the increase of the output torque.

When the output torque of the engine 1 reaches the required value of the output torque for the engine 1 while the rate of increase of the output torque of the engine 1 is being limited in the torque limiting operation, the operation to limit the rate of increase of the output torque is finished. Therefore, the rate of increase of the output torque of the engine 1 is prevented from unnecessarily continuing to be limited in the torque limiting operation, and the limiting operation can be appropriately finished when it becomes unnecessary to limit the rate of increase of the output torque.

Figure 4:
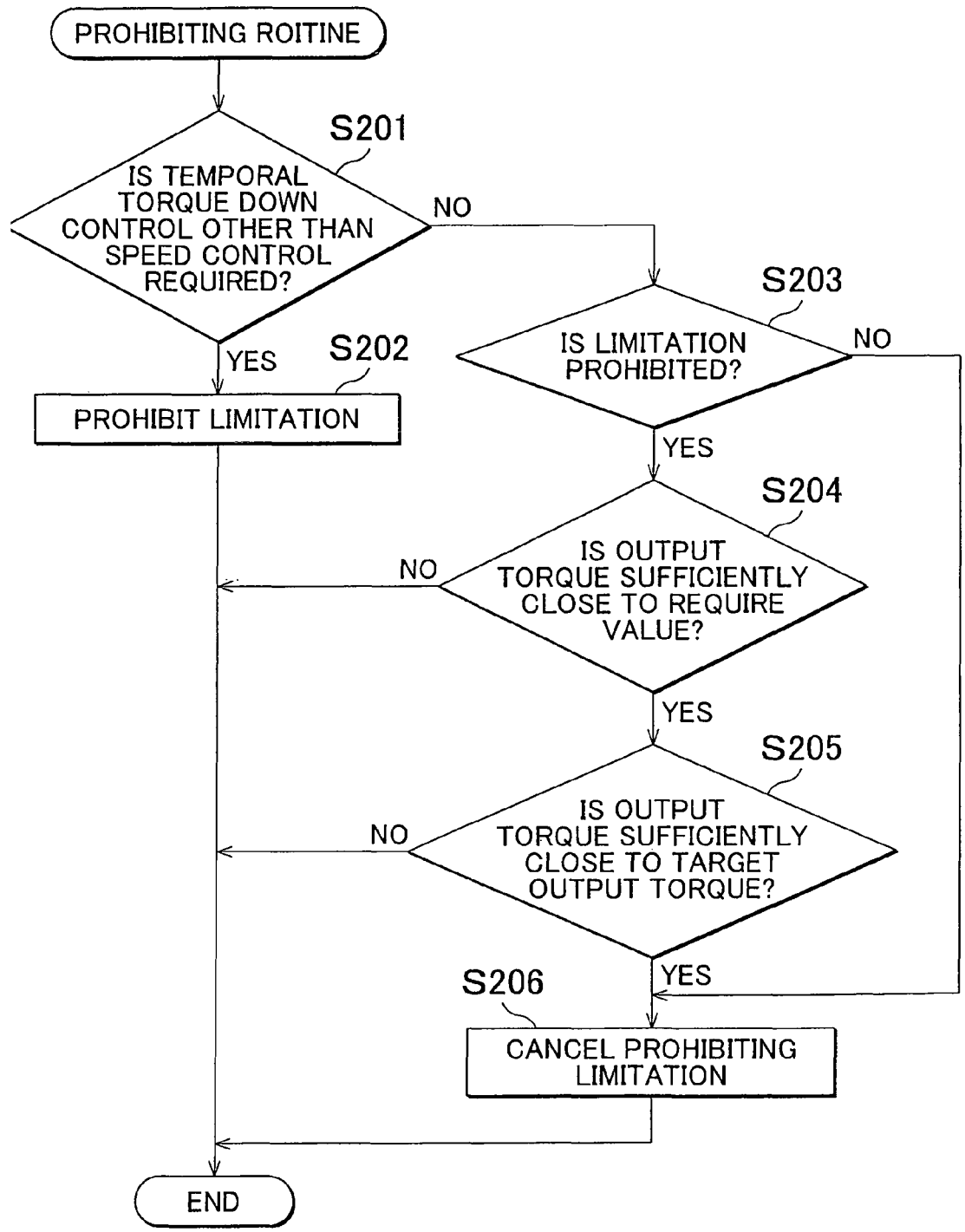
FIG. 4 is a flowchart illustrating control routine for prohibiting limitation on increase of output torque in the torque limiting operation.
Figure 5:
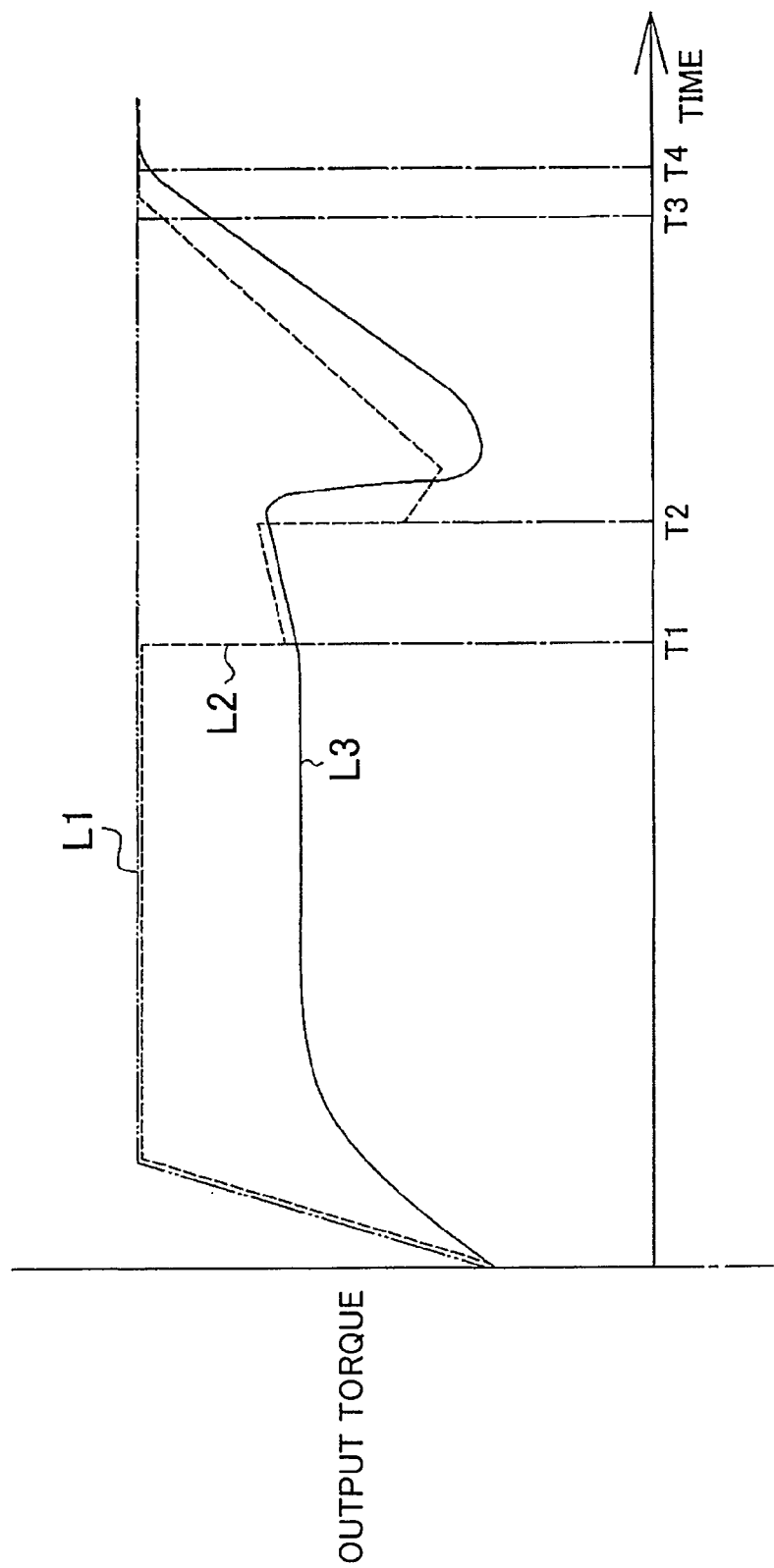
FIG. 5 is a time chart indicating change in output torque of the engine.

Referring to FIG. 4 and FIG. 5, a control device of an engine with a turbocharger according to a second embodiment of the invention will be described. The limitation on the increase of the output torque of the engine through the torque limiting operation is performed when the required value increases as the amount of accelerator operation by the driver increases. The limitation on the increase of the output torque of the engine through the torque limiting operation is also performed in following situation. That is, if the engine 1 is required to decrease torque temporarily by a speed control by a transmission which is connected to the engine 1, the electronic control unit 21 temporarily decreases the target output torque relative to the required value that is set based on the accelerator operation amount etc. Thereby, the output torque of the engine 1 decreases. Then after the output torque of the engine decreases, the electronic control unit 21 increases the output torque of the engine 1 to the required value by setting the target output torque to the required value. As just described, when the target output torque is set to the required value so as to increase the output torque of the engine 1 to the required value, the following situation occurs. That is, the target output torque deviates to the larger side from the actual output torque of the engine 1, and the increase of the actual output torque stagnates. In such situation, the limitation on the increase of the output torque of the engine through the torque limiting operation is performed.

For example, a torque down control (temporal torque down control) based on the requirement to decrease the engine torque temporarily is performed by the shift control of the transmission to suppress torque fluctuations. If the limitation on the increase of the output torque of the engine through the torque limiting operation is performed to increase the output torque of the engine 1 after the torque down control based on the requirement to decrease the engine torque temporarily is performed. Therefore, a rapid increase of the output is suppressed and it is beneficial to suppress torque fluctuations of the engine 1 due to a shift control of the transmission.

The temporal torque down control for the engine arises from a control other than the speed control. When the temporal torque down control for the engine arises from a control other than the speed control, it is desired to increase torque with a good response based on the requirement after torque has decreased. For example, the temporal torque down control for the engine arises from a vehicle stability control (VSC) through the electronic control unit 21. Besides the temporal torque down control for the engine arises from various controls, for example a four-wheel driving control, a pre-crash control and an accidental pedal operation prevention control etc.

When the output torque of the engine 1 is increased after the temporal torque down control for the engine 1 arises from a control other than the speed control while the rate of increase of the output torque of the engine 1 is being limited in the torque limiting operation and the temporal torque down control is performed, the following problem occurs if the limitation on the rate of increase of the output torque is prohibited as referred to above. Namely, limiting the increase of the output torque prevents from the engine increasing torque with a good response after torque has decreased temporarily. Consequently, it is delayed to increase the output torque of the engine after torque has decreased temporarily.

To deal with the above situation, in the second embodiment when the engine 1 is required to decrease torque temporarily by a control other than the speed control while the increase of the output torque of the engine is being limited in the torque limiting operation, the electronic control unit 21 prohibits limiting the increase of the output torque of the engine and the electronic control unit controls the output torque of the engine based on a requirement to decrease torque temporarily.

Therefore, when the temporal torque down control for the engine 1 arises from a control other than the speed control while the rate of increase of the output torque of the engine 1 is being limited in the torque limiting operation, limiting the increase of the output torque does not prevent from the engine increasing torque with a good response after torque has decreased temporarily. Consequently, it is suppressed to be delayed to increase the output torque of the engine 1 after torque has decreased temporarily based on the temporal torque down control.

For example, when the temporal torque down control for the engine 1 arises from a control other than the speed control, the output torque of the engine 1 based on a requirement to decrease torque temporarily is controlled as follows. Namely, the electronic control unit 21 decreases the target output torque temporarily in accordance with the temporal torque down control while the opening of the waste gate valve 9 is set to a normal-time value (in this case, the waste gate valve 9 is fully closed). Then the electronic control unit 21 increases the target output torque to the require value of the output torque for the engine 1. The require value of the output torque for the engine 1 is set based on the accelerator operation amount, etc. Then the electronic control unit 21 changes the opening of the throttle valve 6 of the engine 1 in accordance with change of the target output torque. Thereby, the output torque for the engine 1 is increased to the require value that is set based on the accelerator operation amount, etc. after the temporal torque down control for the engine 1 is performed.

FIG. 4 is a flowchart illustrating a prohibiting routine for prohibiting the limitation on the increase of the output torque in the torque limiting operation. The prohibiting routine, which is an interruption routine, is periodically executed at given time intervals, for example.

The electronic control unit 21 determines in step S201 of the routine of FIG. 4 whether or not the temporal torque down control for the engine 1 arises from a control other than the speed control. If an affirmative decision (YES) is made in step S201, the electronic control unit 21 executes step S202. The electronic control unit 21 prohibits the limitation on the rate of increase of the output torque of the engine 1 in the torque limiting operation. Then the electronic control unit 21 once finishes the prohibiting routine. By the prohibiting routine, the limitation on the rate of increase of the output torque of the engine 1 in the torque limiting operation is immediately finished if the limitation on the rate of increase of the output torque of the engine 1 in the torque limiting operation is being performed. Further, the electronic control unit 21 controls the output torque of the engine 1 in accordance with a requirement of the temporal torque down control arisen from a control other than the speed control.

If, on the other hand, a negative decision is made in step S201, the control proceeds to step S203: The electronic control unit 21 determines in step S203 of the routine of FIG. 4 whether or not the limitation on the rate of increase of the output torque of the engine 1 in the torque limiting operation is being prohibited. If a negative decision is made in step S203, the control proceeds to step S206. In step S206 the electronic control unit 21 cancels prohibiting the limitation on the rate of increase of the output torque of the engine 1 in the torque limiting operation. (The electronic control unit 21 permits the limitation on the rate of increase of the output torque of the engine 1 in the torque limiting operation.) Thereby, it is possible to perform the limitation on the rate of increase of the output torque of the engine 1 in the torque limiting operation. The electronic control unit executes the process of step S206 then the electronic control unit 21 once finishes the prohibiting routine.

If the electronic control unit 21 determines that the limitation on the rate of increase of the output torque of the engine 1 in the torque limiting operation is being prohibited in step S203, the control proceeds to step S204. In step S204, the electronic control unit 21 determines whether or not a value of the target output torque comes sufficiently close to the require value of the output torque. The target output torque changes in accordance with a requirement of the temporal torque down control other than the speed control. The require value of the output torque for the engine 1 is set based on the accelerator operation amount, etc. For detail, the electronic control unit 21 determines whether or not a difference between the value of the target output torque and the require value of the output torque is less than a predetermined value A. The electronic control unit 21 determines that the target output torque comes sufficiently close to the require value of the output torque when the difference between the value of the target output torque and the require value of the output torque is less than the predetermined value A. Then the control proceeds to step 205.

In step S205, the electronic control unit 21 determines whether or not a value of the actual output torque of the engine comes to sufficiently close to a value of the target output torque. For detail, the electronic control unit 21 determines whether or not a difference between the value of the actual output torque of the engine and the value of the target output torque is less than a predetermined value B that is smaller than the predetermined value A. The electronic control unit 21 determines that the value of the actual output torque of the engine comes to sufficiently close to the value of the target output torque when the difference between the value of the actual output torque of the engine and the value of the target output torque is less than the predetermined value B. Then the control proceeds to step 206. In step S206 the electronic control unit 21 cancels prohibiting the limitation on the rate of increase of the output torque, of the engine 1 in the torque limiting operation. (The electronic control unit 21 permits the limitation on the rate of increase of the output torque of the engine 1 in the torque limiting operation.) Then the electronic control unit 21 once finishes the prohibiting routine.

FIG. 5 is a time chart indicating change in the require value of the output torque (two-dot chain line L1), the target output torque (broken line L2) and the actual output torque (solid line l3) of the engine 1 when the temporal torque down control for the engine 1 arises from a control other than the speed control while the rate of increase of the output torque of the engine 1 is being limited in the torque limiting operation. A predicted value may be used as an actual output torque of the engine 1. The predicted value is calculated based on an operating condition of the engine 1 several milliseconds before the engine 1 outputs torque.

At a timing T1 in FIG. 5, the require value of the output torque of the engine 1 (the target output torque) that is set based on the accelerator operation amount, etc. deviates to the larger side from the actual output torque of the engine 1 and, and the increase of the actual output torque stagnates. At that time the actual output torque of the engine 1 is controlled in accordance with the target output torque that changes as shown by the broken line L2 by performing the torque limiting operation. The limitation of the rate of increase of the output torque of the engine 1 in the torque limiting operation is performed by controlling the actual output torque of the engine 1.

At a timing T2, when the temporal torque down control for the engine 1 arises from a control other than the speed control while the rate of increase of the output torque of the engine 1 is being limited in the torque limiting operation, the electronic control unit 21 prohibits limiting the increase of the output torque of the engine 1 and the electronic control unit 21 controls the output torque of the engine based on a requirement to decrease torque temporarily. For detail the electronic control unit 21 changes the target output torque as shown by the broken line L2 from a timing T2. The electronic control unit 21 performs the temporal torque down control as shown by the solid line l3 by controlling the actual output torque in accordance with the target output torque that changes as shown by the broken line L2. Then the electronic control unit 21 increase the actual output torque of the engine 1.

During the process increasing the output torque of the engine 1 after the temporal torque down control is performed, the target output torque (broken line L2) is coming close to the require value of the output torque. Then the electronic control unit 21 determines that the target output torque comes sufficiently close to the require value of the output torque when the difference between the value of the target output torque and the require value of the output torque is less than the predetermined value A. Further the actual output torque (solid line L3) is coming close to the target output torque. The electronic control unit 21 determines that the value of the actual output torque of the engine comes to sufficiently close to the value of the target output torque when the difference between the value of the actual output torque of the engine and the value of the target output torque is less than the predetermined value B. When the difference between the value of the target output torque and the require value of the output torque is less than the predetermined value A (after timing T3) and when the difference between the value of the actual output torque of the engine and the value of the target output torque is less than the predetermined value B (timing T4), the electronic control unit 21 cancels prohibiting the limitation on the rate of increase of the output torque of the engine 1 in the torque limiting operation.

According to this embodiment as described in detail above, the following effects are obtained. When the temporal torque down control for the engine 1 arises from a control other than the speed control while the rate of increase of the output torque of the engine 1 is being limited in the torque limiting operation, the electronic control unit 21 prohibits limiting the increase of the output torque of the engine 1 and the electronic control unit 21 controls the output torque of the engine based on a requirement to decrease torque temporarily. Thereby, when the temporal torque down control for the engine 1 arises from a control other than the speed control while the rate of increase of the output torque of the engine 1 is being limited in the torque limiting operation, limiting the increase of the output torque does not prevent from the engine increasing torque with a good response after torque has decreased temporarily. Consequently, it is suppressed to be delayed to increase the output torque of the engine 1 after torque has decreased temporarily based on the temporal torque down control.

The above-described embodiment may be changed as follows, for example. In the first embodiment, the point in time at which the output torque starts rapidly increasing may be found or detected by monitoring the actual output torque of the engine 1, instead of monitoring sequential maximum torque.

In the torque limiting operation of the first embodiment, when the target output torque is gradually increased at a given rate after being reduced by a given amount, the rate of increase of the target output torque can be varied according to the required value of the output torque for the engine 1 when the required value changes. However, the rate of increase of the target output torque is not necessarily made variable. For example, after the rate of increase of the target output torque is initially set, the rate of increase may not be changed even if the required value changes.

In the torque limiting operation of the first embodiment in which the target output torque is gradually increased at a given rate after being reduced by a given amount, the rate of increase of the target output torque may be initially set based solely on the magnitude of the required value of the output torque for the engine 1, or may be initially set based solely on the length of period t2.

In the torque limiting operation of the first embodiment, the rate of increase of the output torque of the engine 1 may be limited by increasing the opening of the waste gate valve 9 so as to reduce, the boost pressure, instead of reducing the opening of the throttle valve 6 through control of the throttle opening.

In the first embodiment, when the required value of the output torque for the engine 1 increases while the rate of increase of the output torque of the engine is being limited in the torque limiting operation, the limiting operation may be finished as a measure to reduce the limitation put on the rate of increase of the output torque. It is also possible to finish the limiting operation when the required value is reduced, as well as when the required value is increased. In the second embodiment, when prohibiting the limitation on the increase of the output torque of the engine in the torque limiting operation, the prohibition may be performed only when the following condition is satisfied. That is, the limitation on the increase of the output torque of the engine may be performed when a minimum value of the output torque of the engine 1 in accordance with a requirement of the temporal torque down control arisen from a control other than the speed control is less than the value of the target output torque when the limitation on the increase of the output torque of the engine is performed.

In the first and second embodiments, as a parameter used for regulating the output torque of the engine 1, the driving force of the vehicle (i.e., the force that acts on the wheels in the direction of rotation thereof) may be used. Since there is a correlation between the output torque of the engine 1 and the driving force of the vehicle, a target value may be set for the driving force of the vehicle, and the output torque of the engine 1 may be regulated so that the driving force is controlled toward the target value. When the output torque of the engine 1 is regulated in this manner, too, substantially the same effects as those provided by the above embodiment are obtained.

What is claimed is:

1. A control device of an engine including an exhaust gas turbocharger having an exhaust gas driven turbine with a turbine wheel and a compressor wheel, the control device comprising:
an electronic control unit configured to
   (a) set a target output torque based on a required value of an output torque for the engine;
   (b) regulate the output torque of the engine to the target output torque by controlling a waste gate, throttle valve and fuel injectors; and
   (c) when the target output torque is larger by at least a predetermined amount than the actual output torque and the rate of increase of the actual output torque is equal to or smaller than the predetermined value, limit an increase of an actual output torque of the engine from a timing at which a rate of increase of the actual output torque would exceed a predetermined value.

2. The control device according to claim 1, wherein the electronic control unit is configured to limit the increase of the actual output torque by controlling an opening of a throttle valve.

3. The control device according to claim 1, wherein the electronic control unit is configured to put a reduced limitation on the increase of the actual output torque, when the required value of the output torque for the engine increases while the increase of the actual output torque is being limited.

4. The control device according to claim 1, wherein the electronic control unit is configured to finish limiting the increase of the actual output torque, when the actual output torque reaches the required value of the output torque for the engine while the increase of the actual output torque is being limited.

5. The control device according to claim 1, wherein the electronic control unit is configured to limit the increase of the actual output torque by reducing the target output torque to a value that is smaller than the required value of the output torque for the engine and then increasing the target output torque at a predetermined rate of increase.

6. The control device according to claim 5, wherein the electronic control unit is configured to, when the required value of the output torque for the engine changes while the increase of the actual output torque is being limited, change the rate of increase of the target output torque according to the required value that has changed.

7. The control device according to claim 1, wherein:
the electronic control unit is configured to calculate a maximum torque that is generated from the engine under a boost pressure to be achieved after a predetermined period of time elapses, when the target output torque is larger by at least the predetermined amount than the actual output torque of the engine and the rate of increase of the actual output torque is equal to or smaller than the predetermined value; and
the electronic control unit is configured to determine a timing at which the rate of increase of the actual output torque exceeds the predetermined value by monitoring the maximum torque, and limit the increase of the actual output torque from the timing.

8. The control device according to claim 1, wherein:
the electronic control unit is configured to prohibit limiting the increase of the actual output torque of the engine when the engine is required to decrease torque temporarily by a control other than a speed control by a transmission which is connected to the engine while the increase of the actual output torque of the engine is being limited; and
the electronic control unit is configured to control the actual output torque of the engine in accordance with a requirement to decrease torque temporarily.

9. A method of controlling an engine including an exhaust gas turbocharger having an exhaust driven turbine with a turbine wheel and a compressor wheel, with an electronic control unit, the method comprising:

setting, by the electronic control unit, a target output torque based on a required value of an output torque for the engine;

regulating, by the electronic control unit, the output torque of the engine to the target output torque by controlling a waste gate, throttle value and fuel injectors; and when the target output torque is larger by at least a predetermined amount than the actual output torque and the rate of increase of the actual output torque is equal to or smaller than the predetermined value, limiting, by the electronic control unit, an increase of an actual output torque of the engine from a timing at which a rate of increase of the actual output torque would exceed a predetermined value.

* * * * *